(12) United States Patent
Halperin

(10) Patent No.: US 6,318,631 B1
(45) Date of Patent: Nov. 20, 2001

(54) SCANNING COMMUNICATOR

(75) Inventor: Avner Halperin, Tel Aviv (IL)

(73) Assignee: Eldat Communication Ltd., Bnei Brak (IL)

( * ) Notice: Subject to any disclaimer, the term of this patent is extended or adjusted under 35 U.S.C. 154(b) by 0 days.

(21) Appl. No.: 09/058,822

(22) Filed: Apr. 13, 1998

(51) Int. Cl.[7] .................................................. G06K 15/00
(52) U.S. Cl. ............................................ 235/383; 235/494
(58) Field of Search ..................... 235/383, 385, 235/380, 375, 494; 705/14, 16, 21, 22, 23, 24; 360/132, 137

(56) References Cited

U.S. PATENT DOCUMENTS

| | | |
|---|---|---|
| 4,002,886 | 1/1977 | Sundelin . |
| 4,139,149 | 2/1979 | Crepeau et al. . |
| 4,387,297 | 6/1983 | Swartz et al. . |
| 4,409,470 | 10/1983 | Shepard et al. . |
| 4,521,677 | 6/1985 | Sarwin . |
| 4,760,248 | 7/1988 | Swartz et al. . |
| 4,766,295 | 8/1988 | David et al. . |
| 4,782,219 | 11/1988 | Crater . |
| 5,019,811 | 5/1991 | Olsson et al. . |
| 5,029,034 | * 7/1991 | Weiley . |
| 5,313,569 | 5/1994 | Olsson et al. . |
| 5,345,071 | 9/1994 | Dumont . |
| 5,361,871 | 11/1994 | Gupta et al. . |
| 5,382,779 | 1/1995 | Gupta . |
| 5,457,307 | 10/1995 | Dumont . |
| 5,572,653 | 11/1996 | DeTemple et al. . |
| 5,933,813 | * 8/1999 | Teicher et al. . |

FOREIGN PATENT DOCUMENTS 1-0229390 * 9/1989 (JP) .

* cited by examiner

Primary Examiner—Karl D. Frech
(74) Attorney, Agent, or Firm—Pillsbury Winthrop LLP

(57) ABSTRACT

A scanning communicator for use with a bar code and an electronic label including at least one optical transceiver and circuitry operative to cause the optical transceiver to scan the bar code while in a bar code scanning mode and communicate with the electronic label while in an electronic label communications mode.

17 Claims, 4 Drawing Sheets

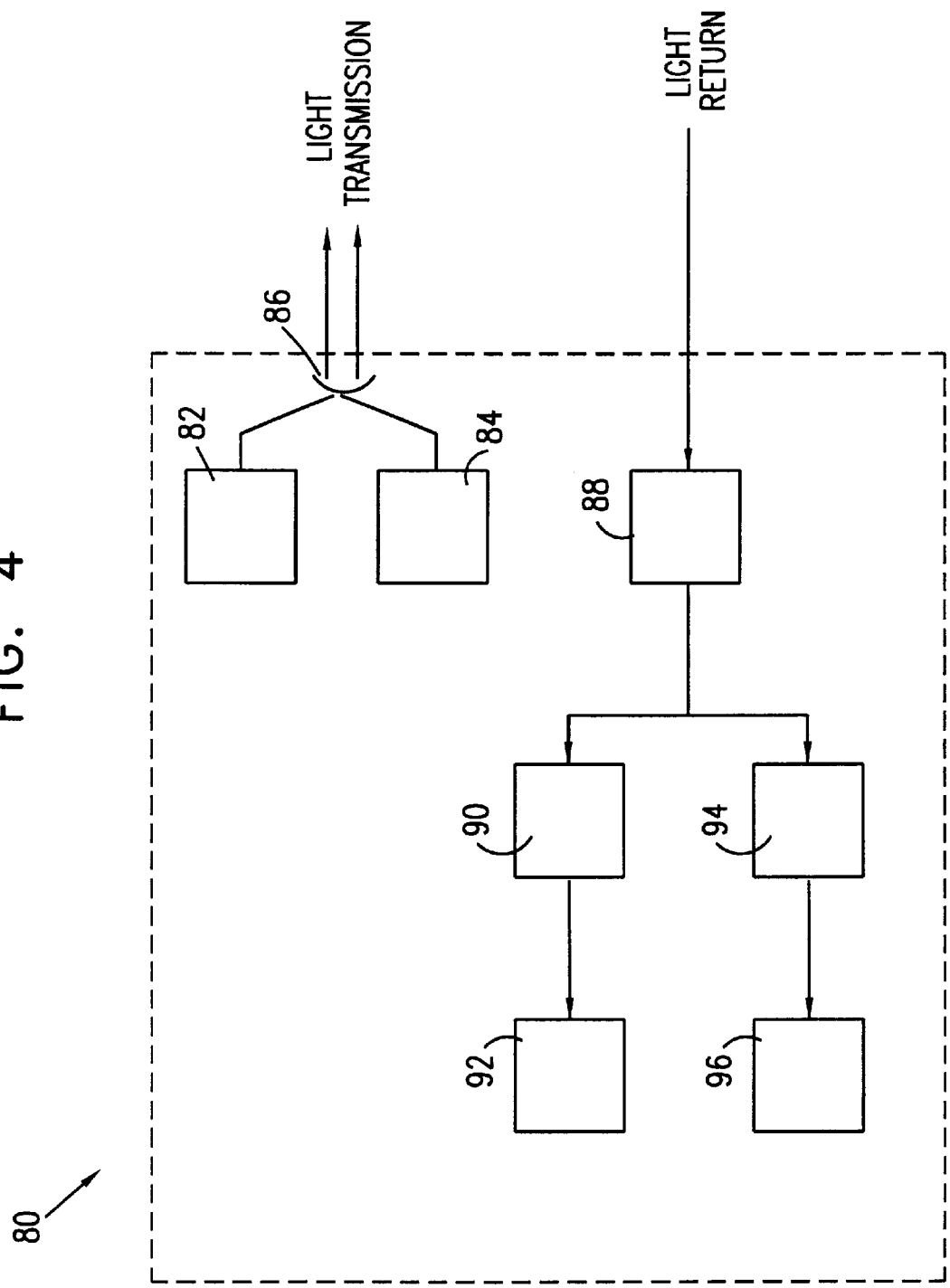

SCANNING COMMUNICATOR

FIELD OF THE INVENTION

The present invention relates to bar code and electronic labeling systems in general, and in particular to improved methods and apparatus for providing synergy between bar code and electronic labeling systems.

BACKGROUND OF THE INVENTION

Bar codes are expressed as a pattern of bars and spaces of varying widths that represent digits, letters, or other symbols. In retail stores and warehouses, items are often identified through the use of bar codes, and store and warehouse personnel often use and are familiar with bar code readers that read bar codes. The particular way in which bars and spaces are arranged is called a symbology, of which there are many. The Universal Product Code (UPC) and its counterpart, the International Article Numbering Association Code (EAN), are extensively used in retail applications. Very popular in industrial, medical and government applications is Code 39, an alphanumeric symbology with self-checking properties that offers a variable length and a high degree of data security. Bar codes may be printed directly on items to be scanned or on labels that are attached to the item.

Typically, a bar code reader is used to illuminate a bar code symbol using an infrared or visible light source. Dark bars absorb the light, and the white spaces between the bars reflect the light back into the reader. A light detector in the reader transforms the presence or absence of light reflections into electrical impulses which represent the bar and space pattern in the bar code. A decoder translates the electrical impulses into a binary code which is transmitted to a PC or other controller or host computer system. The decoder may be integrated with or separate from the reader. Readers typically use visible and infrared light-emitting diodes (LED), helium-neon lasers, or solid-state laser diodes (visible and infrared) to illuminate the bar code symbol. Some readers employ charge-couple devices (CCD) which electronically "sees" the whole symbol at once. Two-dimensional CCD readers are used to read matrix symbologies. Some readers require close contact with the bar code being read, while others may read the bar code from distances up to several feet. Some readers are stationary, while others are hand-held. A bar code scanner is typically a bar code reader that uses a narrow laser beam that "scans" over a bar code, usually by reflecting the laser beam off of a small mirror within the reading device.

Electronic labels, such as Electronic Shelf Labels (ESL), are often used together with bar code identification to identify and provide information about items. These label typically have a receiver to receive initialization information and price update information, as well as a transmitter to send back information such as acknowledgment information and additional data, such as is described in applicant/assignee's U.S. patent application Ser. Nos. 08/839,839, 08/632,576, 08/699,375, and PCT applications PCT-IL-97/00339, and PCT-IL-97/00192. The receiver and transmitter are typically wireless, employing RF or optical communications means. In retail stores, electronic labels are often used and are initialized and updated by store personnel. For that purpose, store personnel typically carry portable terminals that communicate with the electronic labels.

A primary disadvantage of known bar code systems and electronic label systems when collectively considered is that separate communications devices are currently employed for bar code scanning and electronic label communications.

In addition, bar code scanning with hand-held devices usually requires relatively accurate aiming in terms of both position and angle with respect to the bar code being read. This presents a major limitation with regard to self-scanning systems where store shoppers, not skilled in bar code reading, are provided with a hand held devices that include bar code readers. The shoppers often become frustrated by the difficulties in aiming the bar code readers and in scanning wrinkled, worn, or wet bar code labels. In addition, while it is known to display bar codes on Liquid Crystal Displays, the use of such displays is disadvantageous in that the display must be of a very high resolution and contrast, and must have a large number of display lines to effectively display a bar code, all rendering such displays too expensive for mass implementation in electronic labels.

The following U.S. patents are believed to represent the state of the art of bar code systems and electronic label systems: U.S. Pat. Nos. 4,002,886, 4,139,149, 4,387,297; 4,409,470, 4,521,677, 4,760,248, 4,766,295, 4,782,219, 5,019,811, 5,313,569, 5,345,071, 5,361,871, 5,382,779, 5,457,307, and 5,572,653.

SUMMARY OF THE INVENTION

The present invention seeks to provide novel apparatus and methods for providing synergy between bar code and electronic labeling systems which overcomes the known disadvantages of the prior art as discussed above. Apparatus is provided which utilizes a bar code scanner to optically communicate with an electronic label.

There is thus provided in accordance with a preferred embodiment of the present invention a scanning communicator for use with a bar code and an electronic label including at least one optical transceiver, and circuitry operative to cause the optical transceiver to scan the bar code while in a bar code scanning mode and communicate with the electronic label while in an electronic label communications mode.

Further in accordance with a preferred embodiment of the present invention the scanning communicator further includes a selector operative to selectably place the circuitry in either of the modes.

Still further in accordance with a preferred embodiment of the present invention the optical transceiver includes at least one optical transmitter and at least one optical receiver.

Additionally in accordance with a preferred embodiment of the present invention the optical transceiver includes a plurality of optical transceivers, and the at least one of the plurality operates in the bar code scanning mode concurrently with at least another of the plurality operating in the electronic label communications media.

Moreover in accordance with a preferred embodiment of the present invention the optical transceiver is operative to communicate with a central computer for data transmission therebetween.

There is also provided in accordance with a preferred embodiment of the present invention a bar code ad electronic label system including at least one boar code, at least one electronic label, and a scanning communicator including at least one optical transceiver, and circuitry operative to cause the optical transceiver to scan the bar code while in a bar code scanning mode and communicate with the electronic label while in an electronic label communications mode.

Further in accordance with a preferred embodiment of the present invention the bar code and electronic label system further includes a selector operative to selectably place the circuitry in either of the modes.

There is additionally provided in accordance with a preferred embodiment of the present invention as electronic label including at least one optical transceiver, circuitry operative to cause the optical transceiver to intermittently transmit light pulses representative of a predetermined bar code.

Further in accordance with a preferred embodiment of the present invention the circuitry is operative to cause the optical transceiver to intermittently transmit light pulses thereby emulating a reflected light pattern of the predetermined bar code.

Still further in accordance with a preferred embodiment of the present invention the electronic label further includes a memory for storing the predetermined bar code.

Additionally in accordance with a preferred embodiment of the present invention the circuitry is additionally operative to cause the optical transceiver to communicate in an electronic label communication mode.

Moreover in accordance with a preferred embodiment of the present invention the electronic label further includes an optical power converter operative to convert light received via the optical transceiver to energy.

Further in accordance with a preferred embodiment of the present invention the optical transceiver includes at least one optical transmitter and at least one optical receiver.

Still further in accordance with a preferred embodiment of the present invention the optical transceiver includes a plurality of optical transceivers, and the at least one of the plurality operates in the bar code illumination detection mode concurrently with at least one of the plurality operates in the bar code illumination detection mode concurrently with at least another of the plurality operating in the bar code transmission mode.

There is also provided in accordance with a preferred embodiment of the present invention a self-scanning system including at least one item, at least the bar code associated with the item, at least one electronic label associated with the item, and a scanning communicator including at least one optical transceiver, and circuitry operative to cause the optical transceiver to scan the bar code while in a bar code scanning mode and communicate with the electronic label while in an electronic label communications mode, where the scanning communicator is operative to autonomously switch between either of the modes without the intervention of a user.

There is additionally provided in accordance with a preferred embodiment of the present invention on a customer loyalty system including at least one item, at least one electronic label and associated with the item, and a mobile unit operative to communicate with the electronic label and including a loyal customer identification, a scanning communicator including at least one optical transceiver, and circuitry operative to cause the optical transceiver to communicate with the mobile unit and receive the loyal customer identification therefrom.

There is also provided in accordance with a preferred embodiment of the present invention a shelf restocking system including at least one shelf, at least one electronic label associated with the shelf including at least one optical transceiver, circuitry operative to cause the optical transceiver to intermittently transmit light pulses thereby emulating a reflected light pattern of a predetermined bar code, a computer in communication with the electronic label and operative to configure the electronic label with the predetermined bar code.

It is noted that throughout the specification and claims the term "bar code" refers to any discrete application of a known bar code symbology that may be scanned by a bar code scanner.

BRIEF DESCRIPTION OF THE DRAWINGS

The present invention will be understood and appreciated from the following detailed description, taken in conjunction with the drawings in which:

FIG. 4 is a simplified block diagram of a scanning communicator constructed and operative in accordance with another preferred embodiment of the present invention.

DETAILED DESCRIPTION OF PREFERRED EMBODIMENTS

Figure 1:
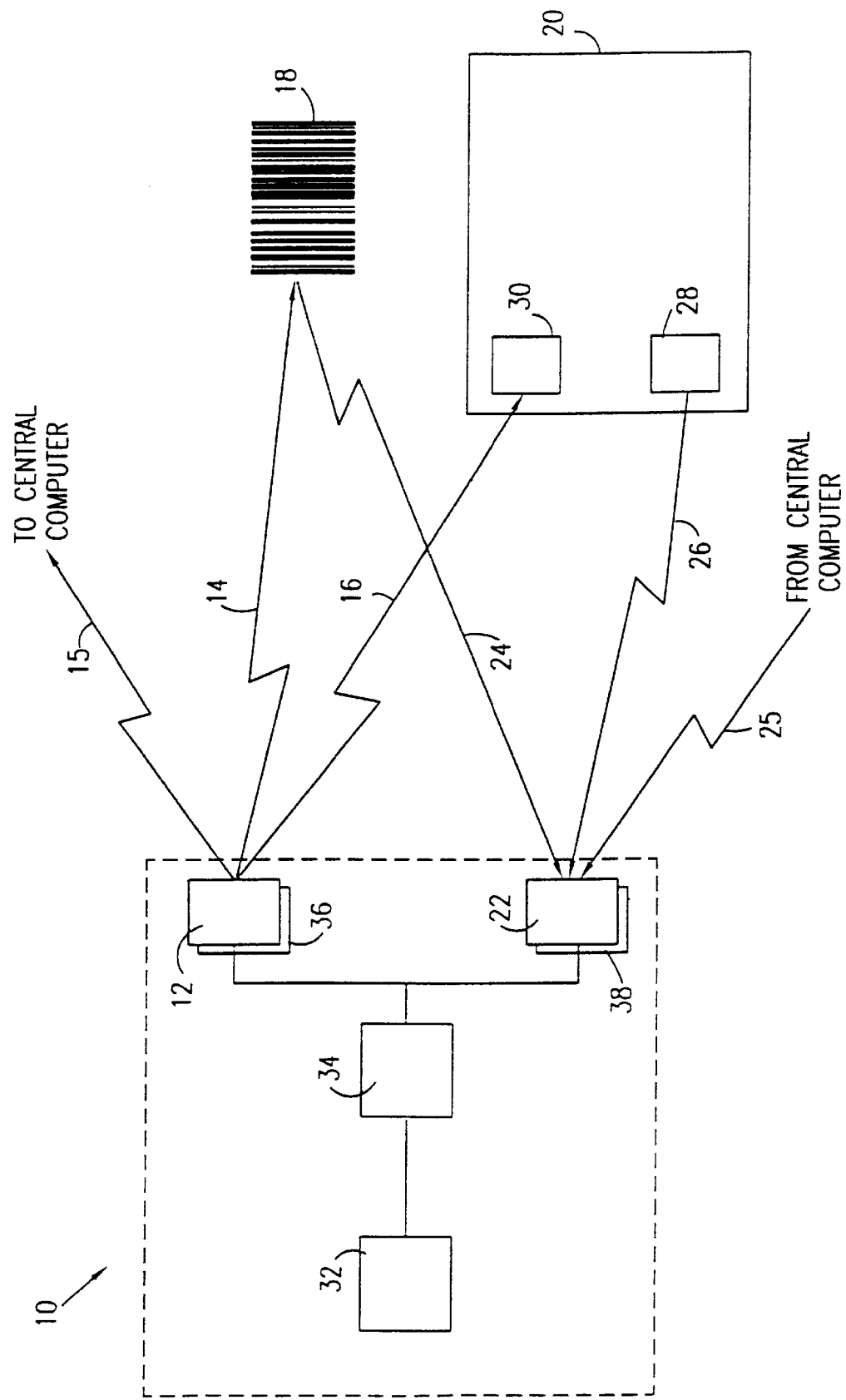
FIG. 1 is a simplified block diagram of a scanning communicator constructed and operative in accordance with a preferred embodiment of the present invention.

Reference is now made to FIG. 1 which is a simplified block diagram of a scanning communicator constructed and operative in accordance with a preferred embodiment of the present invention. A scanning communicator, generally designated 10, is shown typically comprising an optical transmitter 12 capable of illuminating with light beams 14 and 16 a bar code 18 and/or an electronic label 20. Scanning communicator 10 also typically comprises an optical receiver 22 capable of detecting a light reflection 24 from bar code 18 or a light emission 26 from electronic label 20. Electronic label 20 also typically comprises an optical transmitter 28 and an optical receiver 30 as is known. It is appreciated that optical transmitter 12 and optical receiver 22 may be assembled as an integrated optical transceiver, as is known, as may optical transmitter 28 and optical receiver 30. It is also appreciated that optical transmitter 12 may operate in conjunction with a rotating mirror (not shown) as is well know for bar code scanners. Optical transmitter 12 and optical receiver 22 are also preferably capable of optically communicating with a central computer via a light beam 15 and a light beam 25 using known means.

Scanning communicator 10 also typically comprises a selector 32 and circuitry 34 in communication with selector 32. Circuitry 34 preferably controls optical transmitter 12 and optical receiver 22 to scan bar code 18 while in a bar code scanning mode using known bar code scanning technology and protocols. Circuitry 34 also preferably controls optical transmitter 12 and optical receiver 22 to communicate with electronic label 20 while in an electronic label communications mode using know electronic label optical communications technology and protocols. It is a particular feature of the present invention that selector 32 selectably places circuitry 34 in either bar code scanning mode and/or electronic label communications mode. This may be achieved by configuring selector 32 to place circuitry 34 in bar code scanning mode by default until scanning communicator 10 scan bar code 18. Once bar code 18 is successfully detected, selector 32 then places circuitry 34 in electronic label communications mode for communication with electronic label 20 that is typically associated with and physically near bar code 18, or upon which bar code 18 is printed or otherwise affixed. Information pertaining to the product identified by bar code 18 may then be transmitted to electronic label 20 (e.g., price information). Selector 32 may then reset circuitry 34 to bar code scanning mode after a predetermined amount of time passed once communication with electronic label 20 has been concluded. Circuitry 34 also preferably controls optical transmitter 12 and optical receiver 22 to communicate with a central computer using known optical communications methods and protocols.

It is appreciated that when scanning communicator 10 attempts to communicate with electronic label 20 where optical transmitter 12 emits light beams 14 and 16 using scanning laser light, the laser beam preferably impinges on optical receiver 30 of electronic label 20 for a long enough time for the communication to take place. This can be done by increasing the size of the laser spot made on the electronic label with or without stopping the scanning motion of the laser. Increasing the laser spot size can be done in one of several ways:

1. By inserting diffusing material in the optical path of the laser such as is described with reference to U.S. Pat. No. 4,782,219. This can be automatically inserted/removed from the optical path quickly by a small motor or electro-magnet (not shown) as is known;

2. If a lens is used in the laser's beam optical path, the lens position may be moved by a motor or electro-magnet so as to effectively "defocus" the laser beam and thus increase the laser spot size;

3. A second laser or other light source may be used to communicate with the electronic label.

Additionally or alternatively selector 32 may be controlled by a user through a switch or other known user interface (not shown).

Additionally or alternatively the scanning communicator 10 may attempt to scan bar code 18 and automatically initiate communication with electronic label 20 should scanning communicator 10 fail to successfully read bar code 18. This is particularly useful in a self-scanning application. In such an application, a customer may press a "scan" button whereupon the scanning communicator 10 first attempts to communicate with bar code 18 for a predetermined amount of time, and then, if not successful, attempt communication with electronic label 20, both performed in a manner that is transparent to the customer. Thus the customer may effectively receive product information either via bar code 18 or via electronic label 20 where scanning communicator 19 is improperly aimed at bar code 18, or where bar cod 18 is missing, wet, wrinkled, torn or otherwise unreadable.

It is appreciated that scanning communicator 18 may employ one or more additional optical transmitters 36 and optical receiver 38 concurrently with optical transmitter 12 and optical receiver 22. In such a configuration selector 32 may place one optical transmitter/receiver pair in bar code scanning mode and concurrently place another optical transmitter/receiver pair in electronic label communications mode.

Figure 2A:
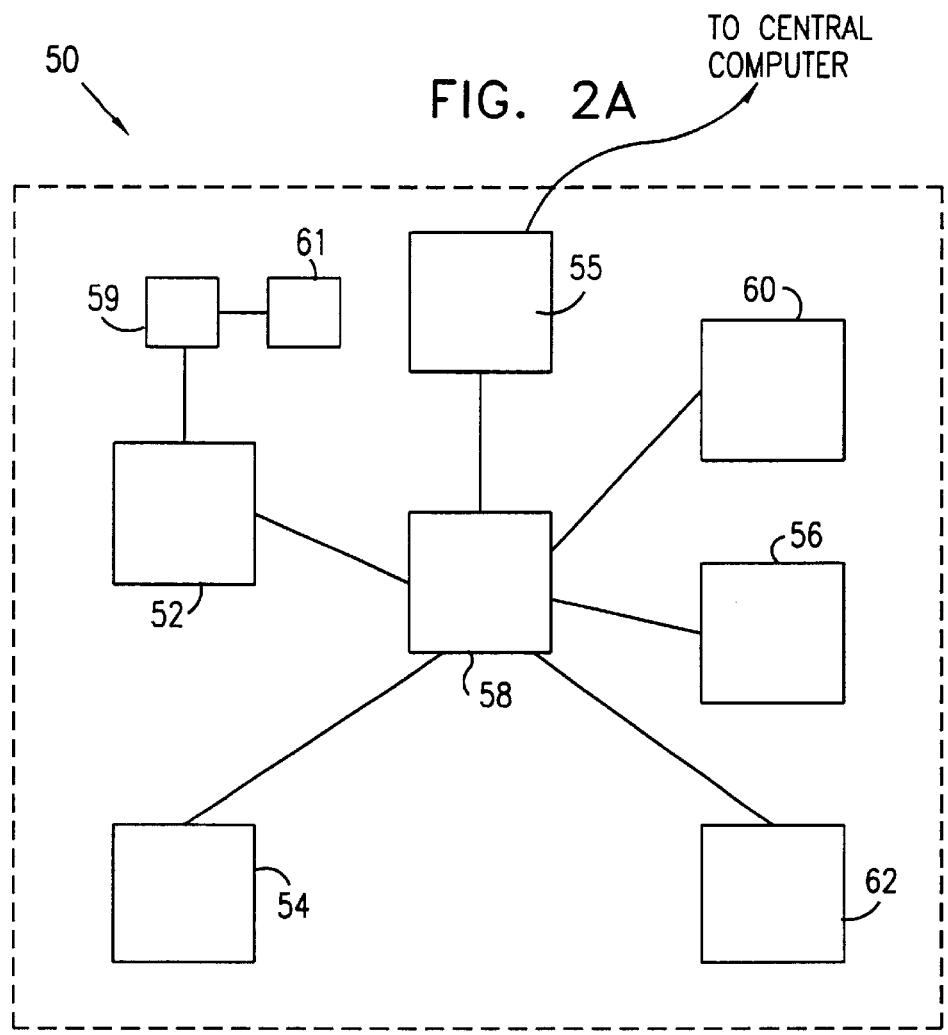
FIG. 2A is a simplified block diagram of an electronic label useful with the scanning communicator of FIG. 1, constructed and operative in accordance with another preferred embodiment of the present invention.

Reference is now made to FIG. 2A which is a simplified block diagram of an electronic label useful with the scanning communicator of FIG. 1, constructed and operative in accordance with another preferred embodiment of the present invention. An electronic label, generally designated 50, is shown typically comprising an optical transmitter 52 capable of emitting light pulses. Electronic label 50 also typically comprises an optical receiver 54 capable of detecting a light illumination from a bar code scanner (not shown) such as from scanning communicator 10 (FIG. 1). It is appreciated that optical transmitter 52 and optical receiver 54 may be assembled as an integrated optical transceiver, as is known. Electronic label 50 may also comprise a transceiver 55 for wired or wireless communication, such as with a central computer (not shown) as is known in the art.

Electronic label 50 also typically comprises a selector 56 and circuitry 58 in communication with selector 56. Selector 56 selectably places circuitry 58 in either electronic label communication mode upon receiving a communication in a known electronic label communication protocol, or in a bar code emulation mode upon detecting light from a bar code reader or scanner. When in bar code emulation mode, circuitry 58 preferably controls optical transmitter 52 to intermittently emit light pulses representative of a predetermined bar code that is typically stored in a memory 60. This may be accomplished with the help of a clock 62 and in a manner such as is explained in greater detail hereinbelow with additional reference to FIG. 2B.

Electronic label 50 preferably differentiates between an optical communication from a known electronic label communication device and the scanning from a known laser bar code scanner. To facilitate this, the transmission from a known electronic label communication device may be modulated at a frequency significantly higher than that produced at optical receiver 54 by the scanning action of a laser. The scanning action of a laser produces a characteristic pulse shape which can be further identified. Optical receiver 54 may also be switched between low and high gain receiver sensitivity levels in order to save the electronic label's power as is known in the art.

Electronic label 50 may be configured to operate with or without an internal power supply as is known. When configured without an internal power supply an optical power converter 59 may be provided that converts power transmitted from the bar code scanner or from ambient light into energy usable by the electronic label. The energy transformed by 59 is accumulated in an accumulator 61, which can be a large capacitor or a rechargeable battery, and used to power the electronic elements of label 50 as needed. Label 50 may additionally use non-volatile (e.g. FLASH) memory to maintain data when power in unavailable.

Figure 2B:
FIG. 2B is a simplified graphical illustration useful in understanding the operation of the electronic label of FIG. 2A.

Additional reference is now made to FIG. 2B which is a simplified graphical illustration useful in understanding the operation of electronic label 50 of FIG. 2A. Upon detecting a bar code illumination, selector 56 then places circuitry 58 in bar code transmission mode and controls optical transmitter 52 to intermittently emit light pulses that emulate the returning light signal from a bar code such as bar code 64 for a time interval known as t. Optical transmitter 52 would emit no light pulse for a relatively long duration corresponding to a relatively wide segment 66 of bar code 64 and would emit no light pulse for a relatively short duration corresponding to a relatively narrow segment 68 of bar code 64. Optical transmitter 52 would emit a light pulse to correspond to a gap 70 between two contiguous segments of bar code 64. The timing of the pulses may be controlled through the use of clock 62 (FIG. 2A). Thus a bar code scanner receiving the emitted light pulses from electronic label 50 would interpret the received intermittent light pulses exactly as it would the returned light from bar code 64.

Figure 3:
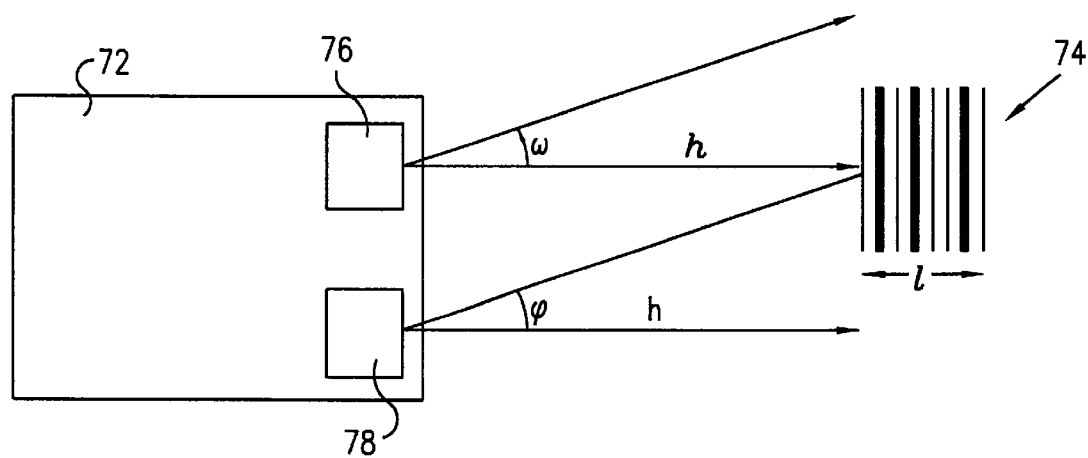
FIG. 3 is a simplified graphical illustration of a preferred mode of operation of the scanning communicator of FIG. 1.

A bar code scanner—electronic label system is now described with reference to FIG. 3. It has been found through experimentation that it may be preferable to use a bar code scanner of the laser type and not the CCD type in conjunction with an electronic label as described in FIGS. 2A and 2B. If a scanner 72 is designed to scan at distance h between a rotating mirror 76 and a bar code 74 and the angular scanning rate is w (in radians/sec) and the standard bar code length is l, then an optical receiver 78 should be configured to receive the reflected bar code signal at a time period t where:

$$t = \frac{2\arctan\left(\frac{1}{2h}\right)}{\omega}$$

Where an electronic label is used to emulate bar code 74 as is described hereinabove with reference to FIGS. 2A and 2B, the bar code light transmission should be done within the time period t.

Additionally, since bar code scanners often include a moveable mirror to cause the illumination to sweep across a bar code, and the viewing area of optical receiver 78 may also move during this sweep, the viewing angle Ø of optical receiver 78 should preferably be made to be at least as large as $$\emptyset \geq 2wt$$

and preferably at least two to four times that.

Most bar code scanners scan using visible light, while the majority of optically communicating electronic labels communicate using near infrared light (wavelength of 850–960 nm). It would thus be advantageous either to change the wavelength with which an electronic label, such as electronic label 50 (FIG. 2A), communicates or the wavelength with which the bar code scanner, such as scanning communicator 10 (FIG. 1), scans. Alternatively, the infrared ("daylight") filter common to infrared optical detectors in electronic labels may be adapted so it will pass enough of the light of the visible source to allow reception. Similarly, the optical detector in the scanning communicator should preferably be sensitive to both the wavelength of the scanning communicator's light source and the wavelength of the electronic label's transmitter.

The amplitudes of the light transmission of known electronic labels may also be significantly different than those returned from the printed bar code. This may require a wide ranging Automatic Gain Control (AGC) circuit to be added to the reception circuit of the bar code scanner. A similar AGC may also be incorporated within the optical receiver of electronic label 50 (FIG. 2A).

A system incorporating scanning communicator 10 (FIG. 1) and electronic label 50 (FIG. 2A) to scan bar codes communicated by electronic labels provides the capability to change the bar code information using known communication infrastructures described in the art for updating electronic labels. Such a system may be used for shelf space management in stores as follows. Electronic labels 50 are placed on shelves in a store. Computer software may be used to make suggestions/decisions regarding replacing one product on the shelf with another. An attention catching device is incorporated into the electronic labels as described in the art. When a decision is made to remove a product from a shelf and replace it with another, a central computer transmits that updated bar code and other information to the shelf label of the old product, and the label turns on its attention catching device. A store operator then "scans" the label with scanning communicator 10 and gets the bar code for the new product to be placed on the shelves from the label and may affix new printed information regarding the product as needed and the appropriated product is placed on the shelf. If the operator is carrying the products with him, the system software may require him to scan the product after scanning the label in order to confirm that he is placing the right product in the right place.

Similarly, electronic labels may turn on their attention catching device when ordering or restocking is required. Store personnel may then approach the shelf label scan the product information (thus obviating the requirement to have the bar code printed on a paper sticker and placed on the shelf label as is commonly done today) and/or the quantity to be ordered/restocked into scanning communicator 10 and then act accordingly. In this manner the information passed to the relevant personnel can be updated in real time to the electronic labels without undue interference with the shopping crowd and without requiring store personnel to have their scanning communicators online at all times. The information is scanned into scanning communicator 10 only when required and only by the operator who requires to do so.

A system incorporating scanning communicator 10 (FIG. 1) and electronic label 50 (FIG. 2A) may also be used with mobile units as described in applicant/assignee's U.S. patent application Ser. No. 08/632,576 as well as Israel Patent Applications No. 113,352, 114,965, 120,797 and 122,927. These applications describe a system where loyal customers carry a mobile unit that communicates wirelessly with electronic labels to show special prices for those loyal customers. At checkout the loyal customers identify themselves as such in order to get their loyal customer prices. The mobile unit may then communicate with a scanning communicator at the checkout using methods described hereinabove for scanning communicator 10 and electronic label 50.

FIG. 4 is a simplified block diagram of a scanning communicator constructed and operative in accordance with another preferred embodiment of the present invention. A scanning communicator 80 is provided that is substantially similar to scanning communicator 10 (FIG. 1) with the exception that scanning communicator 80 may simultaneously scan a printed bar code and electronic label. Scanning communicator 80 preferably includes an optical transmitter 82 for scanning a bar code and an optical transmitter 84 for sending a beam of light for communicating with an electronic label. The beam may be modulated in accordance with known electronic label communication protocols that require a modulated transmission. Transmissions from optical transmitter 82 and optical transmitter 84 may be unified into one optical path through the use of a partially reflective and/or transmissive mirror 86 as is known. The returned light from a bar code or an electronic label is preferably received at a single optical detector 88. The resulting electronic signal is then preferably passed through a low pass filter 90 to filter any received bar code reflection where it is then passed to a bar code reception module 92 for standard bar code decoding. The resulting electronic signal is also preferably passed through a high pass filter 94 to filter any received electronic label communications where it is then passed to an electronic label communications module 96 for standard electronic label communications processing. Typically, only one of the modules 92 or 94 will decode a legal signal. Communication with an electronic label is preferably done at a frequency range that is significantly higher than that resulting from scanning a printed bar code. For example, scanning a standard printed UPC one dimensional bar code at a scanning rate of 10 Hz will produce an electronic signal at the detector whose spectral content is generally below 10 KHz. Communicating with the electronic label at a frequency range above 30 KHz may then be performed concurrently with little or no interference.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention in not limited to what has been particularly shown and described hereinabove. Rather, the scope of the present invention is defined only by the claims that follow:

What is claimed is:

1. A scanning communicator for use with a bar code and a machine readable electronic label comprising:
    at least one optical transceiver; and
    circuitry operative to cause said at least one optical transceiver to scan said bar code while in a bar code scanning mode and communicate with said machine readable electronic label while in a machine readable electronic label communications mode, said circuitry also being operative to cause said at least one optical transceiver to intermittently transmit light pulses representative of a predetermined bar code to a machine reader in generally the same pattern received by a bar code reader when reading a conventional bar code.

2. A scanning communicator according to claim 1 and further comprising a selector operative to switch said circuitry to be activated in either of said modes.

3. A scanning communicator according to claim 1 wherein said optical transceiver comprises at least one optical transmitter and at least one optical receiver.

4. A scanning communicator according to claim 1 and further comprising a plurality of said optical transceivers, and wherein at least one of said plurality of said optical transceivers operates in said bar code scanning mode concurrently with at least another of said plurality of said optical transceivers operating in said electronic label communications mode.

5. A scanning communicator according to claim 1 wherein said at least one optical transceiver is operative to communicate with a central computer for data transmission between said at least one optical transceiver and said central computer.

6. A bar code and electronic label system comprising:
    at least one bar code;
    a machine readable electronic label; and
    a scanning communicator comprising;
        at least one optical transceiver; and
        circuitry operative to cause said at least one optical transceiver to scan said bar code while in a bar code scanning mode and communicate with said machine readable electronic label while in a machine readable electronic label communications mode, said circuitry also being operative to cause said at least one optical transceiver to intermittently transmit light pulses representative of a predetermined bar code to a machine reader in generally the same pattern received by a bar code reader when reading a conventional bar code.

7. A bar code and electronic label system according to claim 6 and further comprising a selector operative to switch said circuitry to be activated in either of said modes.

8. A bar code and electronic label system according to claim 6 and further comprising an optical power converter operative to convert power transmitted from at least one of said scanning communicator and ambient light into energy usable by said at least one machine readable electronic label.

9. A machine readable electronic label comprising:
    at least one optical transceiver; and
    circuitry operative to cause said at least one optical transceiver to intermittently transmit light pulses representative of a predetermined bar code to a machine reader in generally the same pattern received by a bar code reader when reading a conventional bar code.

10. An electronic label according to claim 9 wherein said circuitry is operative to cause said optical transceiver to intermittently transmit light pulses thereby emulating a reflected light pattern of said predetermined bar code.

11. An electronic label according to claim 9 and further comprising a memory for storing said predetermined bar code.

12. An electronic label according to claim 9 wherein said circuitry is additionally operative to cause said optical transceiver to communicate in an electronic label communication mode.

13. An electronic label according to claim 9 wherein said optical transceiver comprises at least one optical transmitter and at least one optical receiver.

14. An electronic label according to claim 13 and further comprising a plurality of said optical transceivers, and wherein at least one of said plurality of said optical transceivers operates in a bar code illumination detection mode concurrently with at least another of said plurality of said optical transceivers operating in a bar code transmission mode.

15. A self-scanning system comprising:
    at least one item;
    at least one bar code associated with said item;
    at least one machine readable electronic label associated with said item; and
    a scanning communicator comprising:
        at least one optical transceiver; and
        circuitry operative to cause said at least one optical transceiver to scan said bar code while in a bar code scanning made and communicate with said machine readable electronic label while in a machine readable electronic label communications mode, said circuitry also being operative to cause at least one optical transceiver to intermittently transmit light pulses representative of a predetermined bar code to a machine reader in generally the same pattern received by a bar code reader when reading a conventional bar code,
    wherein said scanning communicator is operative to autonomously switch between either of said modes without the intervention of a user.

16. A customer loyalty system comprising:
    at least one item;
    at least one machine readable electronic label associated with said item; and
    a mobile unit operative to communicate with said at least one machine readable electronic label, said mobile unit comprising a loyal customer identification;
    a scanning communicator comprising:
        at least one optical transceiver; and
        circuitry operative to cause said at least one optical transceiver to communicate with said mobile unit and receive said loyal customer identification from said mobile unit, said circuitry also being operative to cause said at least one optical transceiver to intermittently transmit light pulses representative of a predetermined bar code to a machine reader in generally the same pattern received by a bar code reader when reading a conventional bar code.

17. A shelf restocking system comprising:

at least one shelf;

at least one machine readable electronic label associated with said shelf comprising:

at least one optical transceiver; and circuitry operative to cause said at least one optical transceiver to intermittently transmit light pulses thereby emulating a reflected light pattern of a predetermined bar code to a machine reader in generally the same pattern received by a bar code reader when reading a conventional bar code; and a computer in communicate with said at least one machine readable electronic label and operative to configure said at least one machine readable electronic label with said predetermined bar code.

\* \* \* \* \*